United States Patent [19]

Kelsey

[11] Patent Number: 4,803,819

[45] Date of Patent: Feb. 14, 1989

[54] UTILITY POLE AND ATTACHMENTS FORMED BY PULTRUSION OF DIELECTRIC INSULATING PLASTIC, SUCH AS GLASS FIBER REINFORCED RESIN

[76] Inventor: Frank Kelsey, 1002 Mauna Loa Dr., Forked River, N.J. 08731

[21] Appl. No.: 925,976

[22] Filed: Nov. 3, 1986

[51] Int. Cl.$^4$ ................................................ E04C 3/30
[52] U.S. Cl. ..................................... 52/309.1; 52/738; 52/101; 174/45 R; 256/48
[58] Field of Search ............................. 52/738, 309.1; 248/68.1, 72; 98/122; 256/47, 48, 49; 174/45 A

[56] References Cited

U.S. PATENT DOCUMENTS

| | | | |
|---|---|---|---|
| 511,378 | 12/1893 | Van Wagoner | 256/48 |
| 946,665 | 1/1910 | Ette | 52/737 |
| 1,213,002 | 1/1917 | Pierce . | |
| 1,213,201 | 1/1917 | Hutchinson | 256/48 |
| 1,858,512 | 5/1932 | Langenberg | 29/155 |
| 2,650,948 | 9/1953 | Findlay . | |
| 2,836,397 | 5/1958 | Morrissey | 256/47 |
| 2,841,634 | 7/1958 | Kimball . | |
| 3,013,584 | 11/1961 | Reed et al. . | |
| 3,235,652 | 2/1966 | Lindsey . | |
| 3,399,852 | 9/1968 | Armstrong | 174/45 R |
| 3,489,847 | 1/1970 | Netzel . | |
| 3,622,689 | 11/1971 | Sparks . | |
| 3,813,837 | 6/1974 | McClaim et al. . | |
| 3,977,653 | 8/1976 | Fingerson | 256/10 |
| 4,054,269 | 10/1977 | Stabler | 256/48 |
| 4,061,435 | 12/1977 | Schmanski | 40/612 |
| 4,082,917 | 4/1978 | Hendrix . | |
| 4,136,257 | 1/1979 | Taylor | 248/68.1 |
| 4,194,338 | 3/1980 | Tafton | 52/738 |
| 4,202,520 | 5/1980 | Loos | 248/68.1 |
| 4,228,316 | 10/1980 | MacFarlane . | |
| 4,431,152 | 2/1984 | Reed, Jr. . | |
| 4,435,242 | 3/1964 | McNulty | 156/264 |
| 4,462,572 | 7/1984 | Hanneken | 256/49 |
| 4,646,618 | 3/1987 | Kurth | 89/1.816 |
| 4,680,428 | 7/1987 | Wilson | 256/10 |

FOREIGN PATENT DOCUMENTS

| | | | |
|---|---|---|---|
| 804183 | 1/1987 | Canada | 256/10 |
| 291444 | 6/1965 | Netherlands | 256/47 |

OTHER PUBLICATIONS

Designing with Aluminum Extrusions ©1952 by Reynolds Metals Company, pp. 4 and 36.

Jul. 1980—Article by Lydia Krutchkoff, University of Lowell, Lowell, Mass., "Process Converts Thermoset Materials into Finished Shapes Continuously", Part I.

Aug. 1980—Article by Lydia Krutchkoff, University of Lowell, Lowell, Mass., "Desirable Resin Properties Are High Heat Distortion, Fast Cure, Good Wet-Out," Part 2.

*Primary Examiner*—Henry E. Raduazo
*Attorney, Agent, or Firm*—Martha G. Pugh

[57] ABSTRACT

This relates to reinforced hollow utility poles, and attachments therefore, formed by pultrusion of dielectric insulating material, such as glass fiber reinforced resin, and the method of fabricating the same.

20 Claims, 15 Drawing Sheets

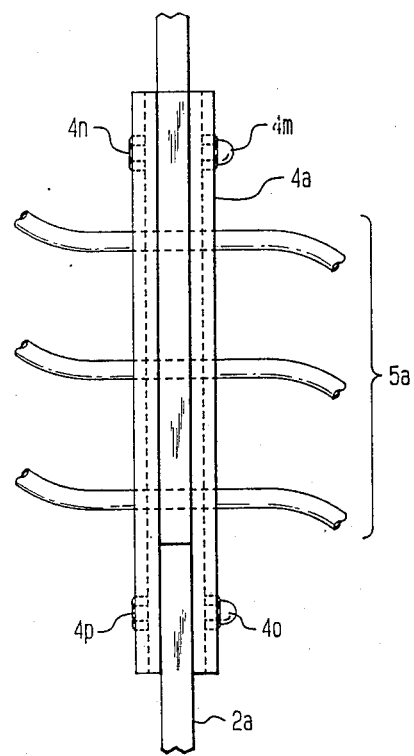
FIG. 7C
FIG. 7D
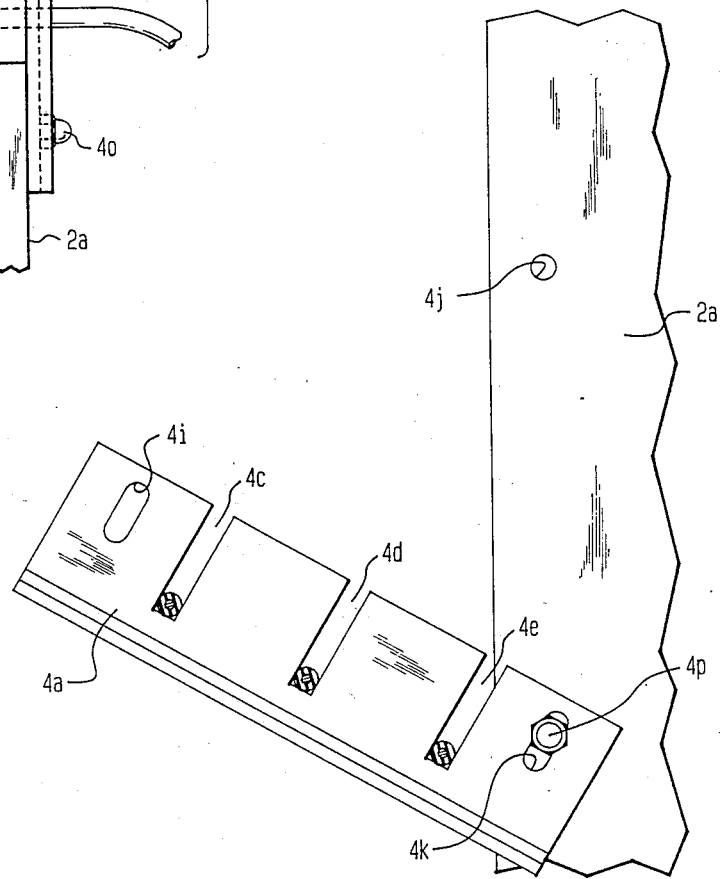

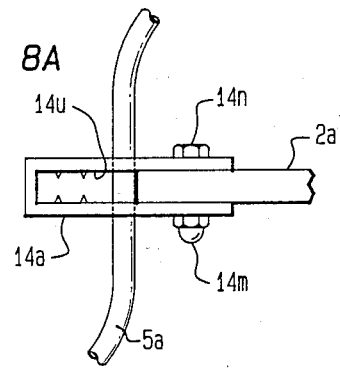
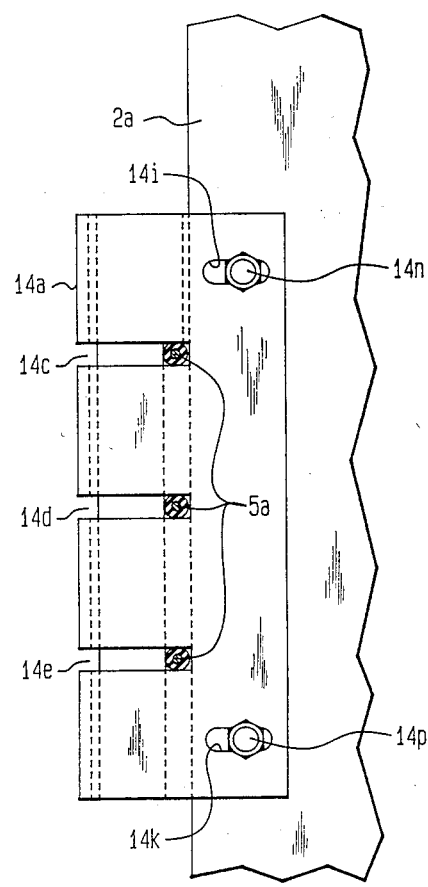
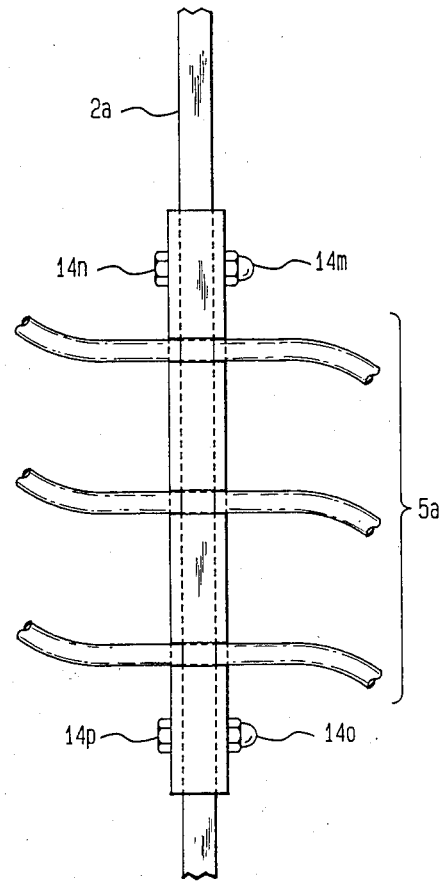

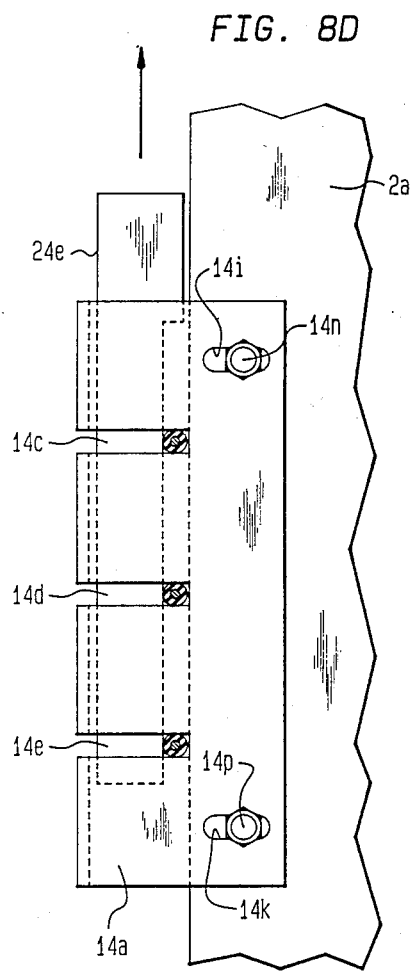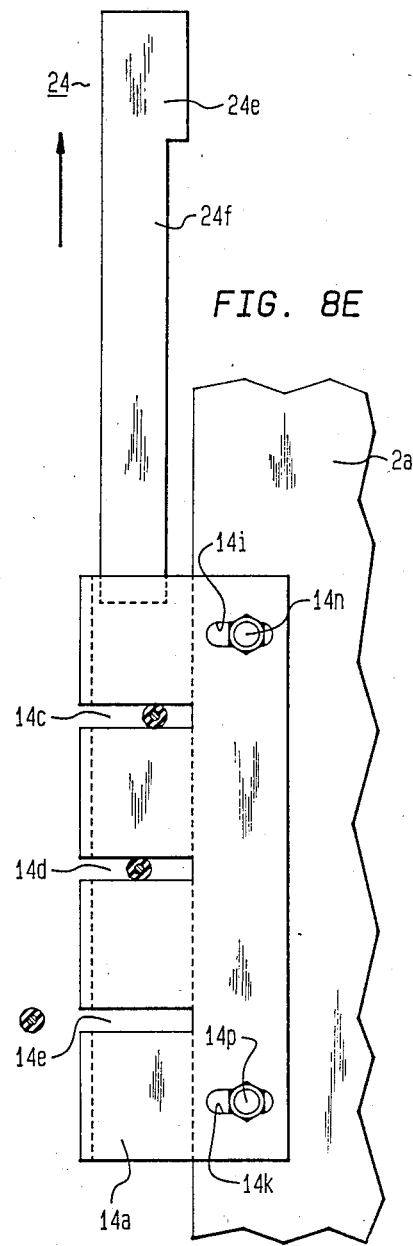

FIG. 14B
FIG. 14A
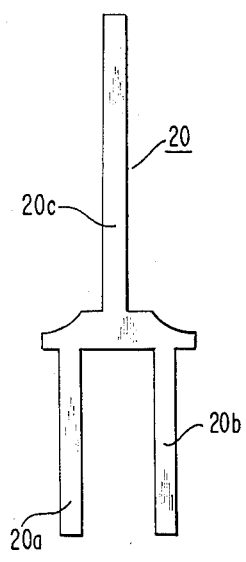
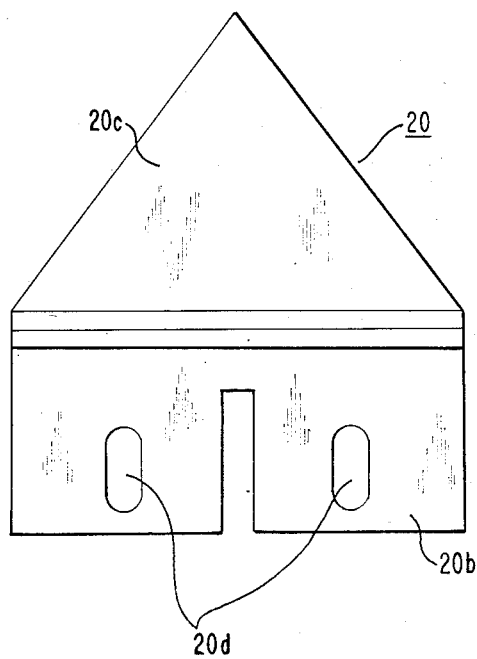

UTILITY POLE AND ATTACHMENTS FORMED BY PULTRUSION OF DIELECTRIC INSULATING PLASTIC, SUCH AS GLASS FIBER REINFORCED RESIN

BACKGROUND OF THE INVENTION

This relates in general to poles and associated attachments constructed to support electrical current-bearing utility cables, namely, telephone poles, electrical power poles, light poles, and the like, and more particularly to such poles which are preformed of insulating material such as a fiber-resin composite, such as glass fiber reinforced resin, and the like, and the fabrication of the same.

In our present power-hungry industrialized society, it is necessary that cables carrying high voltage electrical currents criss-cross the land. In accordance with present practice, most of these cables are supported on wooden or metal poles or supporting structures which have a number of disadvantages.

Wooden poles are subject to normal deterioration, such as rotting, and are also subject to attack by insects, such as termites, and woodpeckers and other birds. Furthermore, because wood is a carbon-based organic material, such wooden poles, especially when water soaked, are highly susceptible to disruptive lightening strikes. This poses a safety hazard to the linesmen working on the transmission amd distribution systems, and also to casual bystanders.

Furthermore, metal poles are substantially more expensive and also poses a safety hazard unless provided with highly insulating attachments.

Poles of plastic, or glass fiber reinforced resin, have been known in the prior art; but their manufacture, according to prior practice, has been cumbersome and expensive. For example, in accordance with one process, plastic poles are constructed in sections, as disclosed in U.S. Pat. No. 2,841,634, issued on July 1, 1958 to Clarence L. Kimball. Another type of plastic pole is constructed in the form of tubular sheaths disposed longitudinally and impregnated with a thermosetting resin, and comprises a tubular liner sleeve made up of a plurality of radially-disposed circumferential strips also impregnated with thermosetting resin. This type is disclosed in U.S. Pat. No. 3,013,584, issued Dec. 19, 1961 to Clair S. Reed and William Russell Bailey. Another form of pole, consisting essentially of glass fiber reinforced resin, is constructed in the form of a longitudinally-extending tapered column, formed by intermittently pressing and rolling resin and glass fibers on a mandrel comprising a frame having radially-extending fins, as disclosed in U.S. Pat. No. 3,813,837, issued to Stephen A. McClain, Harvey A. Doman, and Richard D. Entus on June 4, 1974.

It is the primary object of this invention to provide an improved design of a utility pole of glass fiber reinforced resin, and the like, which is less expensive and simpler to fabricate than those of the prior art. Another object of the invention is to provide an improved method for fabricating utility poles of glass fiber reinforced resin, and the like. Other objects of the invention are to increase the safety and dependability of utility systems employing poles designed in accordance with the present invention.

These and other objects of the invention are realized in a one piece, hollow, reinforced utility pole of glass fiber reinforced resin, or the like, manufactured by a process called 'pultrusion'. This is defined as a process for producing reinforced plastic profiles in continuous lengths by pulling raw materials, comprising thermosetting resins and fiber reinforcements, through uniquely pre-shaped dies in a series of operations in which they are progressively combined, shaped and cured. The product of this process is a hollow tubular structure having internal diametrical reinforcing struts which terminate externally in laterally-projecting fins which extend the length of the tube.

The fins are adapted to accommodate elongated cable-bearing connectors having longitudinal slots, which are adapted to seat onto and be bolted into place on perforations in the fins. Each of the connectors has a plurality of laterally-extending slots which are constructed to close against and support a horizontally-extending array of utility cables. In one embodiment, the connectors are bolted into place against the utility cables with the pole in its upright position; and in another embodiment, the connectors are bolted into place initially, before the pole is raised, and an elongated plug is dropped vertically into position to secure the horizontal array of utility cables in place in the lateral slots.

For protective purposes, to keep water and animals out of the interior, a frusto-pyramidal cap is superposed over the top of the hollow pole; and an anti-roost attachment may be mounted on the top to prevent birds and other animals from roosting there.

A clearance of ½ inch between the pole and the cap and the elliptical holes eight feet above ground level permit natural convection to ventilate the four internal conduits.

A utility pole constructed in accordance with the present invention has the advantage of being formed in one piece to any desired length, and of a uniform cross-section. It is completely insulating, and resistant to animal and insect damage and natural deterioration, such as rotting. A most important feature of the utility pole design of the present invention is the safety which it affords to the linesmen, enabling them to secure the utility wires in place simply, and with a minimum hazard of possible short circuits. Furthermore, the insulating character, strength, and resilience of the poles of the present design make them safe against strikes by lightening and wind damage, thus preventing wide spread utility failure due to storms, and thus saving millions of dollars to utility companies and their customers.

Utility patents in accordance with the present invention are deemed to provide the following additional advantages over wooden utility poles:

a. Glass fiber poles weigh an average 25% of the weight of wooden poles. e.g. (50 ft. wooden pole weighs 2,000 pounds; a glass fiber pole weighs 500 pounds).

b. They require lower labor, handling and shipping costs.

c. Cross arms are eliminated, saving the cost of the arms, metal support components, installation labor and insulators.

d. The attachment assembly of the present invention firmly secures conductors so they cannot loosen and fall to the ground.

e. There are no ceramic insulators, removing temptation as targets for hunters.

f. The material of the poles of the present invention are chemically resistant to acid soil.

g. They will not absorb moisture from ground water, rain or snow.

h. They are environmentally safe, and will not contaminate underground water tables.

i. They are resistant to attack by termites and other insects.

j. The smooth surface of the material employed prevents woodpeckers from getting a foothold, and prevents squirrels from climbing these poles.

k. The poles and assemblies of the present invention are resistant to urine deposited by male dogs and uric acid from birds.

l. They are resistant to the heat and cold of the elements.

m. They include four internal conduits for electric and phone lines.

n. They are designed so conduits are ventilated by natural convection.

o. The material is formulated for high dielectric strength, arc and track resistance, flame retardance and ultra-violet radiation inhibitor.

p. The unique design of the present invention minimizes movement or twisting once the pole is implated in the ground.

q. Glass fiber poles in accordance with the present invention can be cut to desired length, with no waste.

r. Depending on shipping restrictions, a single piece can be of unlimited length.

s. For higher visibility at night, color could be added to the poles, or their accessories.

t. A pole top cover (extra cost), compression molded of glass fiber provides additional cable-bearing assembly and anti-roost design, discouraging birds, squirrels and other animals.

u. Millions of miles of copper wire used in lightening protection for prior art systems would be sharply reduced.

v. High dielectric properties of the material, arc and track resistance tend to reduce creepage distance between current carrying conductors to inches instead of feet.

w. The reduced creepage distance tends to reduce the required height for poles and, in turn, to reduce the cost of a higher pole.

x. The need for circuit breakers used on distribution lines will be reduced.

y. The high dielectric properties of the material give the poles of the present invention insulation values so lightening is not attracted, thereby rendering them immune to lightening strikes.

z. The surface hardness of the material should reduce the use of poles in accordance with the present invention for tacking up political signs, yard sales, clothes lines, etc.

aa. A hurricane or tornado builds up high pressure against the cross arms on wooden poles, the most likely cause for wood poles snapping at the base. There are no cross arms on poles designed in accordance with the present invention.

These and other objects, features, and advantages will be apparent from a detailed study of the specification hereinafter with reference to the attached drawings.

SHORT DESCRIPTION OF THE DRAWINGS

FIG. 7C is a fragmentary end-elevational showing of the attachment of FIGS. 7A and 7B supporting an array of cables; and FIG. 7D is a side-elevational showing of the cable-bearing attachment of FIGS. 7A and 7B, partially removed from the supporting fin.

FIGS. 8A, 8B and 8C are fragmentary showings of a modified form of cable-bearing attachment, in top view, side-elevation, and end-elevation, respectively.

FIG. 8D is a fragmentary side-elevation of the modified cable-bearing attachment seated on one of the fins of the utility pole of the present invention, with the cables secured in place by a longitudinally-extended plug; and FIG. 8E is the fragmentary side-elevational showing of the modified cable-bearing attachment of FIG. 8D, with the longitudinal plug being removed and one of the cables being removed from the open slot.

Figure 9:
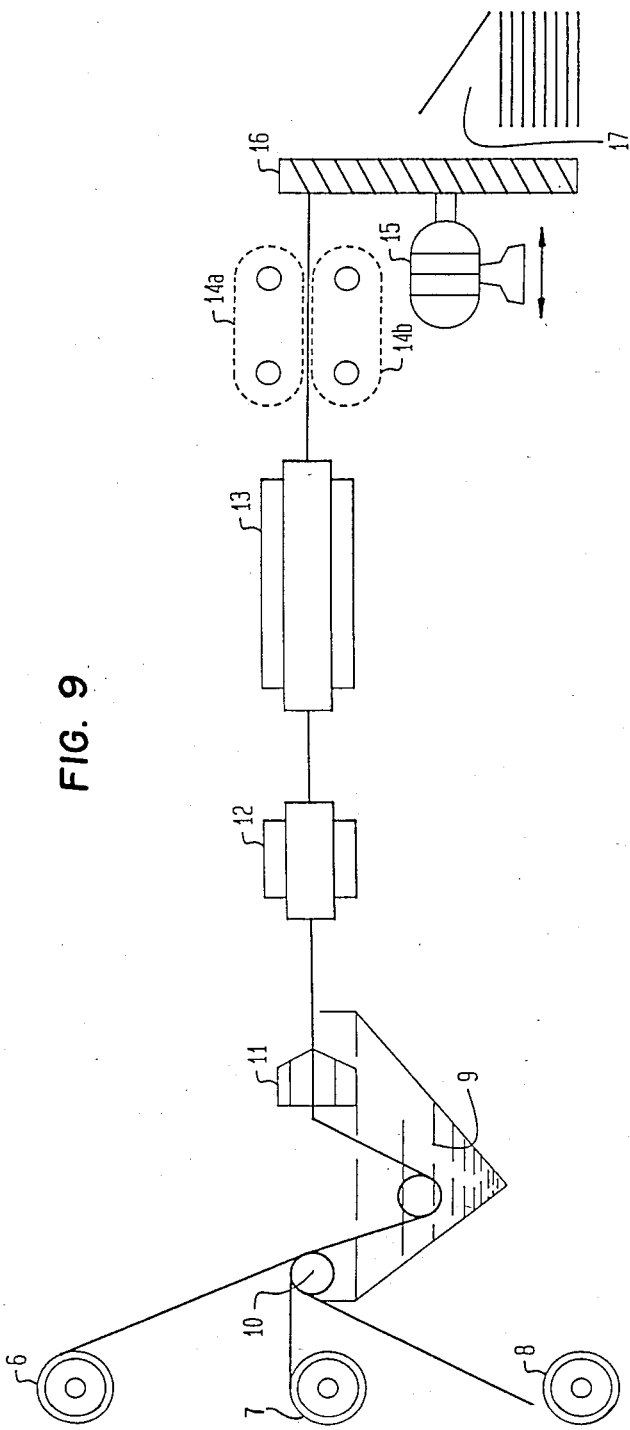

FIG. 9 is a schematic showing to illustrate the pultrusion process of fabricating utility poles in accordance with the present invention.

Figure 10:
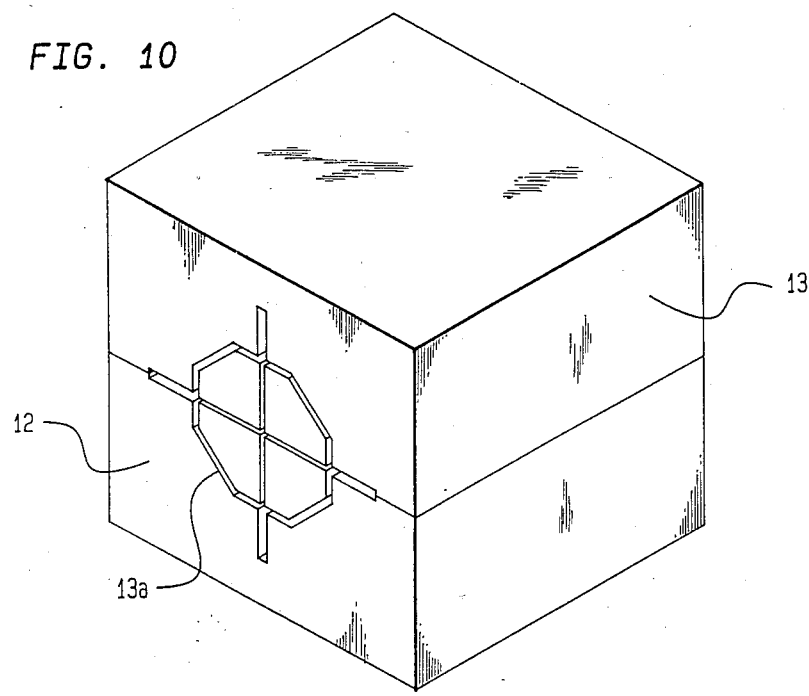

FIG. 10 is an enlarged showing, in perspective, of the shape-preformer die 12 of FIG. 9.

Figure 11:
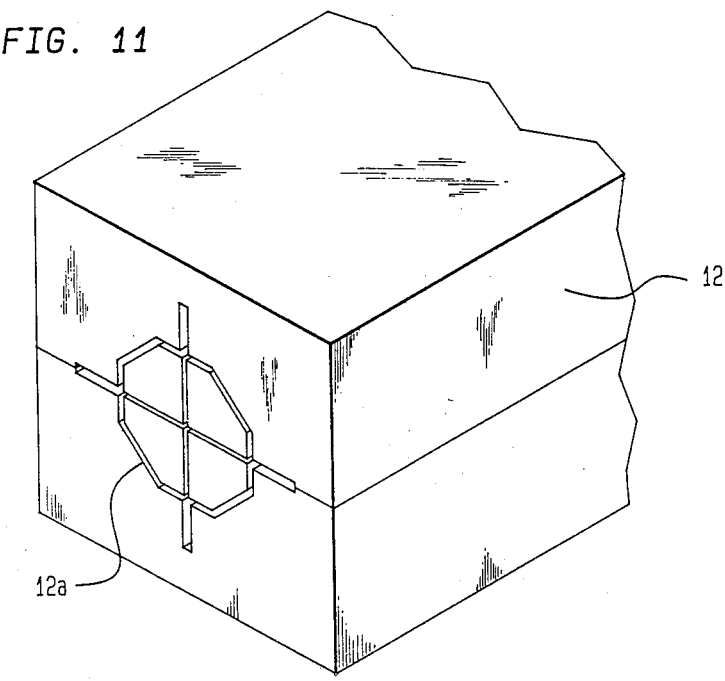

FIG. 11 is a showing, in perspective, of the heated die 13 of FIG. 9.

Figure 7A:
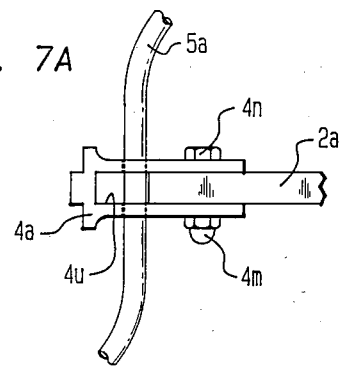
FIGS. 7A and 7B are, respectively, fragmentary top and side-elevational views of the cable-bearing attachments of FIGS. 5 and 6 screwed into place on one of the fins of the utility pole of the present invention.
Figure 12:
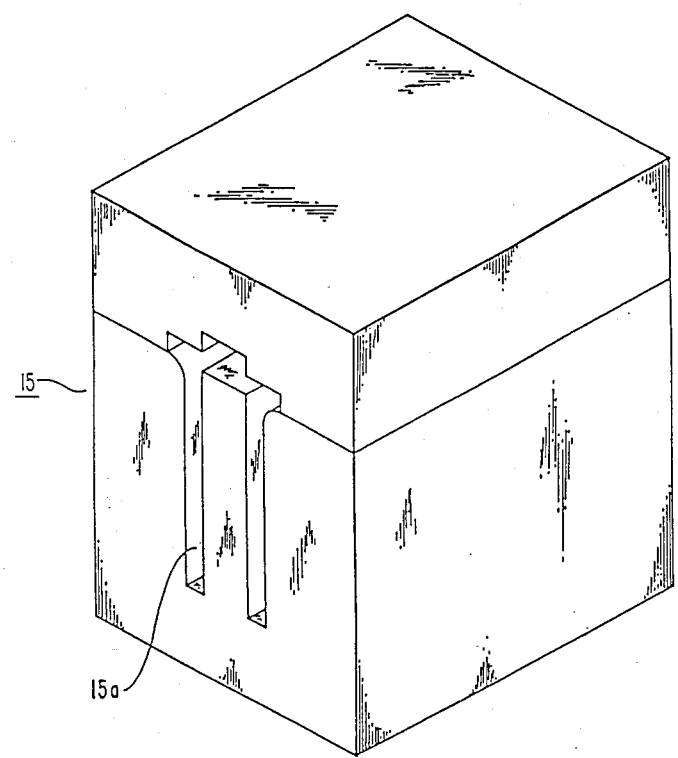

FIG. 12 is a showing, in perspective, of a preforming die 15 for an attachment, such as shown in FIG. 7A.

Figure 1:
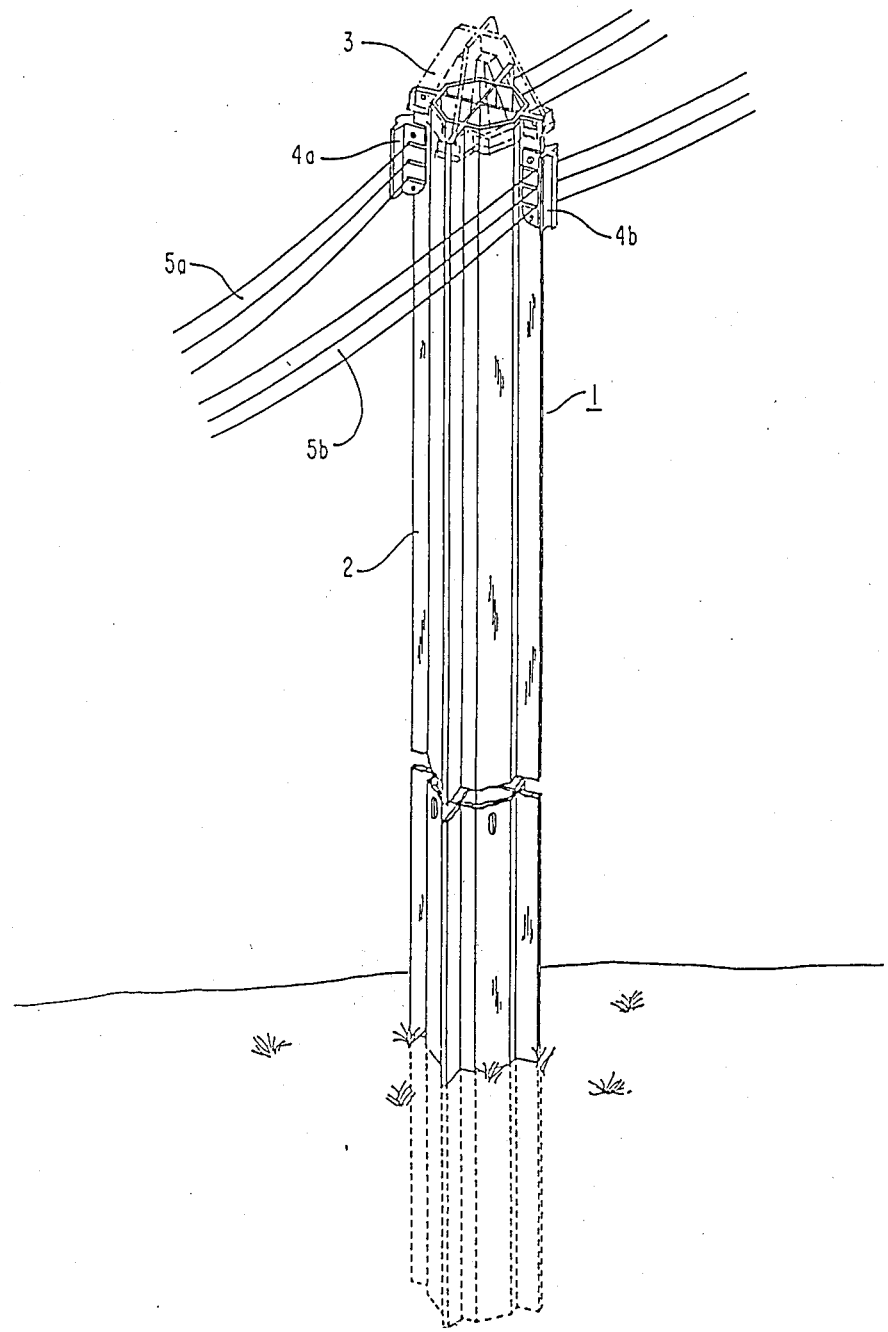
FIG. 1 is an overall showing of a pole assembly of the present invention consisting essentially of glass fiber reinforced resin, or the like, in place with the top on, with the utility cables supported in operating relation.
Figure 13A:
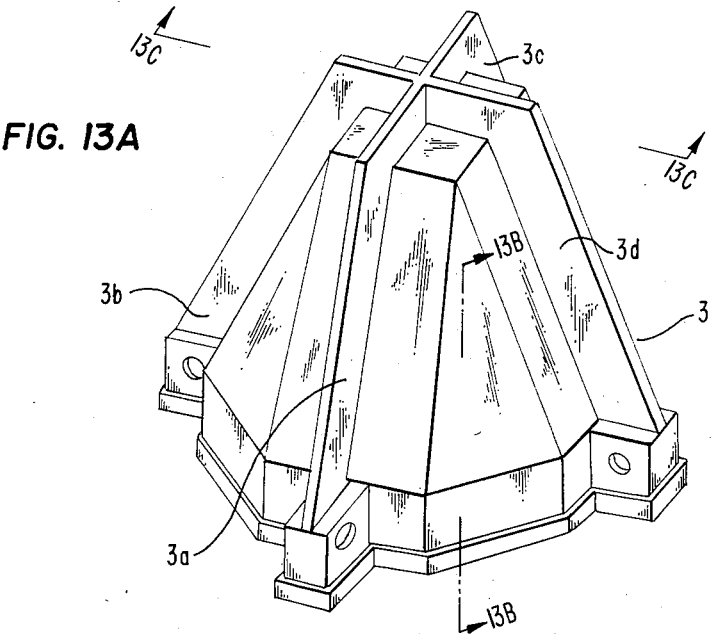
Figure 13B:
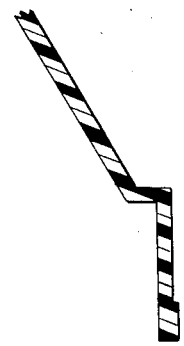

FIGS. 13A, 13B are showings, in perspective, diametrical section, and partial lateral section, respectively, of the cover or "pot" mounted on top of the utility pole of FIG. 1.

FIGS. 14A and 14B are showings, in side-elevation and end-elevation, respectively, of an "anti-roost" attachment to be mounted on top of the cover or pot 13A, 13B.

Figure 15:
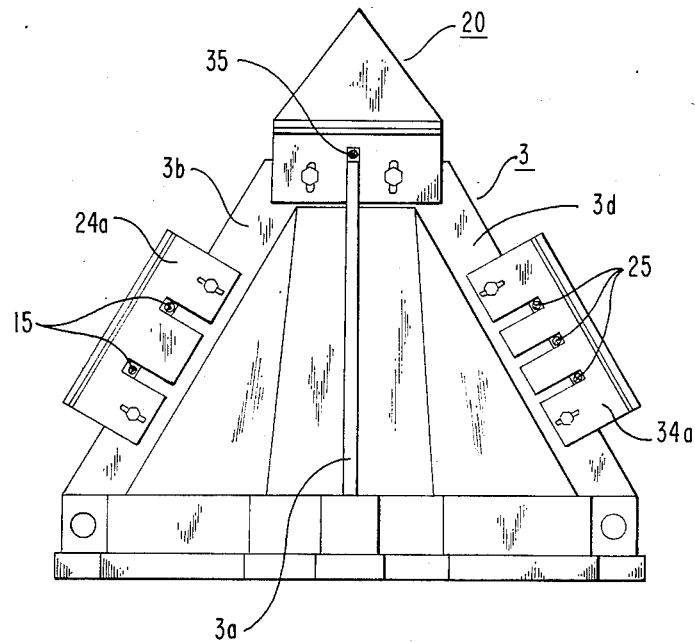

FIG. 15 shows, in front elevation, the cover or "pot", with the "anti-roost" attachment, and also cable-bearing attachments mounted thereon.

DETAILED DESCRIPTION OF INVENTION

Referring to FIG. 1 of the drawings, there is shown a hollow utility pole 1, octagonally shaped in the present embodiment, which has been formed from glass fiber reinforced resin, or the like, by a pultrusion process, which will be described in detail hereinafter.

Figure 2:
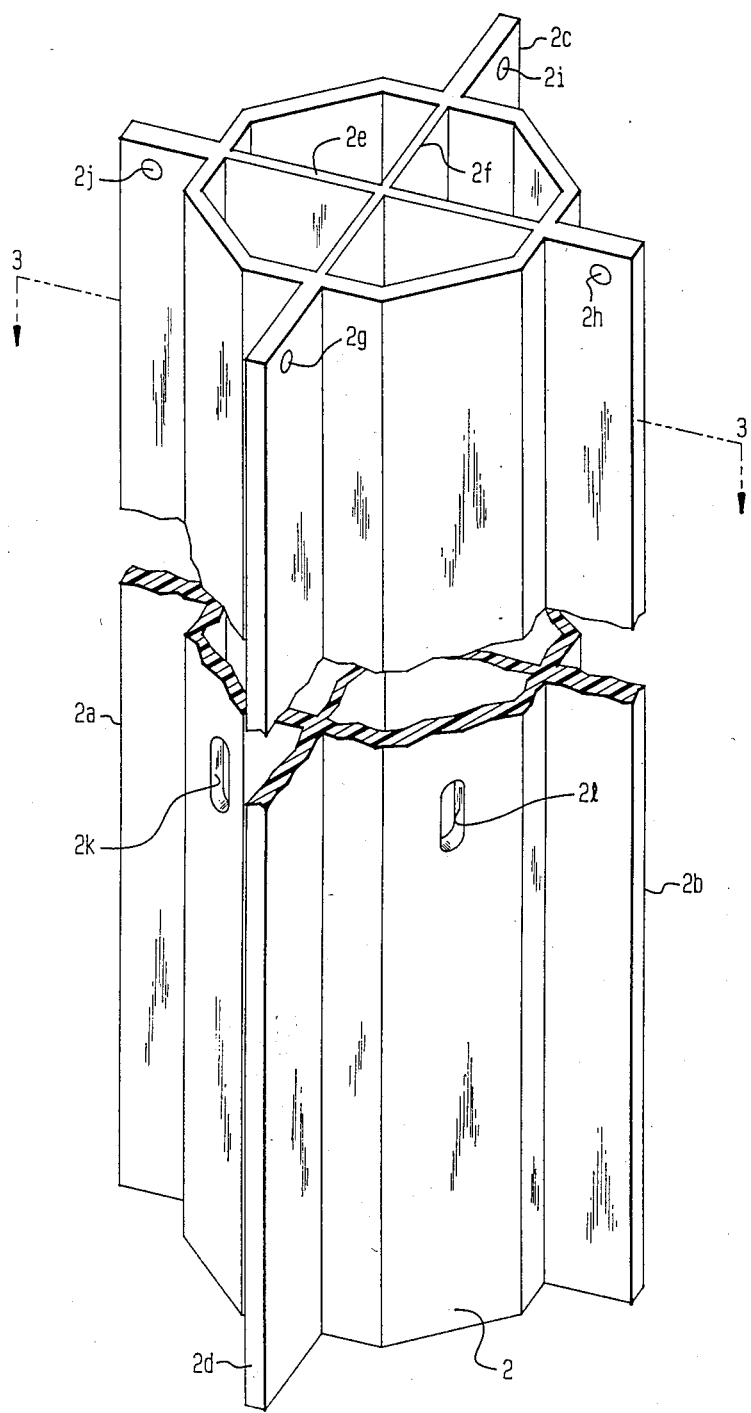
FIG. 2 is an enlarged perspective showing of top and bottom fragments of the hollow body portion of the utility pole of the present invention of glass fiber reinforced resin, or the like, with the top and the cable connecting attachments removed.
Figure 3:
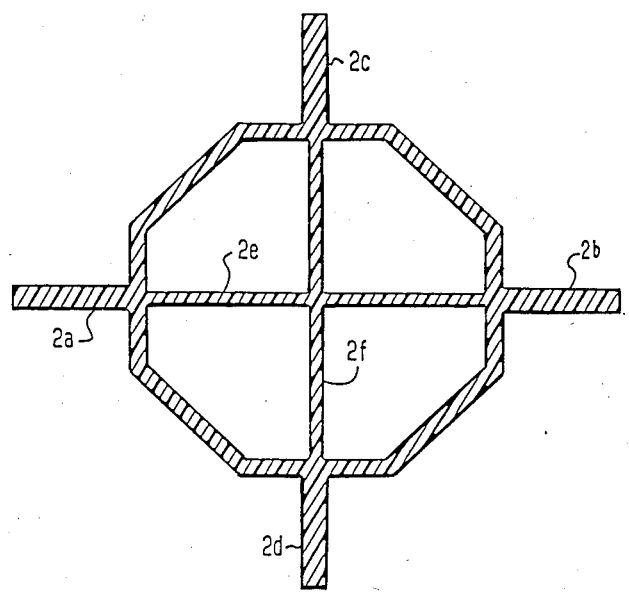
FIG. 3 is a cross-section of the body of FIG. 2 along the plane indicated by the arrows 3—3.

The present illustrative embodiment comprises a hollow body portion 2, fragments of which are shown in enlarged detail in FIG. 2, and in cross-section in FIG. 3. The body of the pole, which in the present embodiment, is 7½ inches in outer diameter between opposite octagonal wall panels, has a uniform wall thickness of ⅛ inch. The pole body is supported internally by two struts, 2e and 2f, which are centered in diametrical relation between opposite octagonal panels, and are disposed at right angles to one another. Struts 2e and 2f, which are ⅛ inch thick in the present embodiment, are extended along the entire length of the hollow pole, dividing it into four equal quadrants. It will be assumed that the pole 1 can be shaped, instead, as a hollow cylinder, or in other polygonal shapes which are symmetrical about the long axis, the cross-sectional dimensions being maintained substantially uniform throughout the length.

A particular feature of the utility pole 1 of the present invention is that each of the struts, 2e and 2f, terminates at its opposite ends, in laterally-protruding fins, 2a and 2b, and 2c and 2d. The fins 2a, 2b, 2c and 2d, in the present embodiment, have their centers aligned with the centers of the respective struts 2e and 2f, and protrude, say, 2 inches in a lateral direction from the periphery of the pole. They may be the same wall thickness as the struts, or, as shown in the present embodiment, slightly larger, say, 3/16 inch in wall thickness in the cross-sectional plane.

Figure 13C:
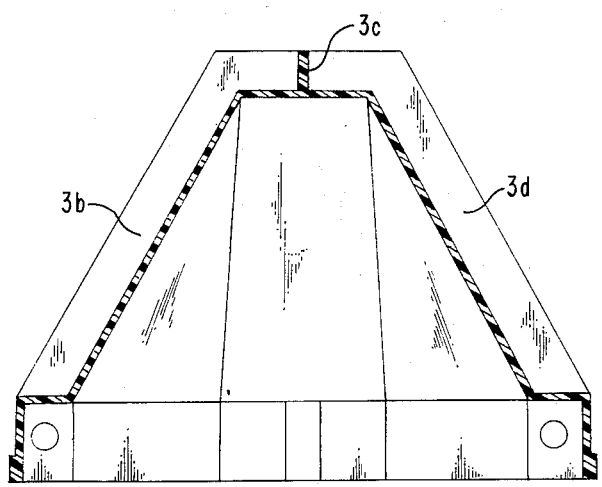

Centered about an inch down from the top on each of the lateral fins, and one inch in from the outer end thereof, are round holes, 2g, 2h, 2i and 2j, say, ¼ inch in diameter, which accommodate bolts for fastening thereon the top or pot 3, which is shown in phantom in FIG. 1, so as not to conceal the cross-sectional construction of the pole. The top or pot 3 will be described hereinafter in detail with reference to FIGS. 13A, 13B and 13C of the drawings.

About thirteen feet above the bottom end of the pole 1 are a plurality of elliptical holes 2k, 2l, and 2m, 2n (the latter two not shown in FIG. 2), centered on the flat panels between the respective struts, which are, say ¼ inch wide and one inch long, and which are disposed to serve for the connection of supporting means, if so desired. It is contemplated that the lower end of the pole, up to a height of about five feet, will be anchored upright in a hole in the ground. Poles are usually planted five feet in the earth.

No concrete is used. Poles damaged when cars or trucks run into them are more easily removed when anchored in the earth.

Elliptical holes eight feet above ground level serve to ventilate the four internal conduits. The eight foot height is out of reach of persons who may be tempted to cover the hole or fill with debris. p The principal function of the utility pole of the present invention is to support at its upper end electrical current bearing cables, such as electrical power lines or telephone lines, although it is contemplated that such a pole could be used for other purposes, such as supporting electrical lighting means.

Figure 4:
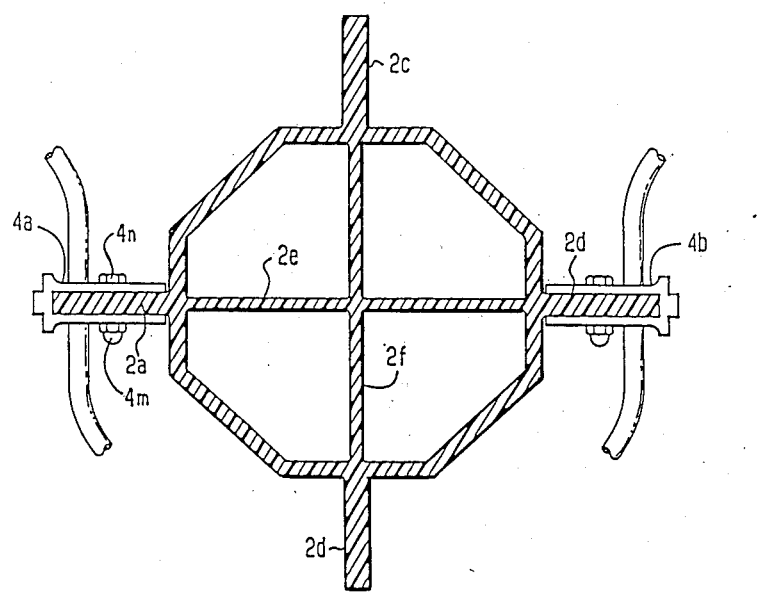
FIG. 4 is a sectional showing in accordance with FIG. 3 with one type of cable-supporting attachments fitted over a pair of oppositely-directed fins attached to the body of the pole.
Figure 5:
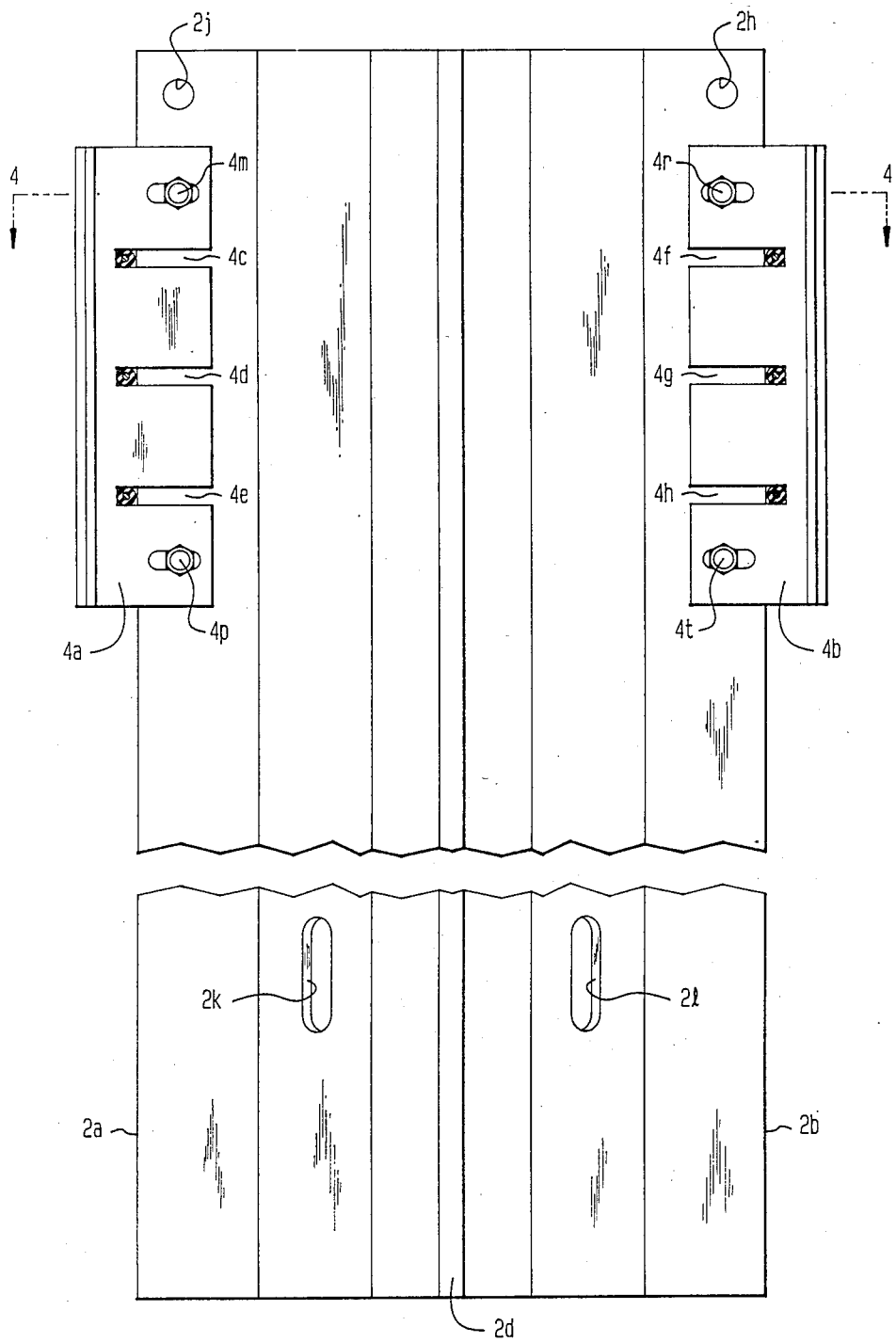
FIG. 5 is a side-elevational showing of the pole shown in section in FIG. 4, including the cable-supporting attachments fitted to fins and supporting cable arrays on opposite sides of the pole body.
Figure 6:
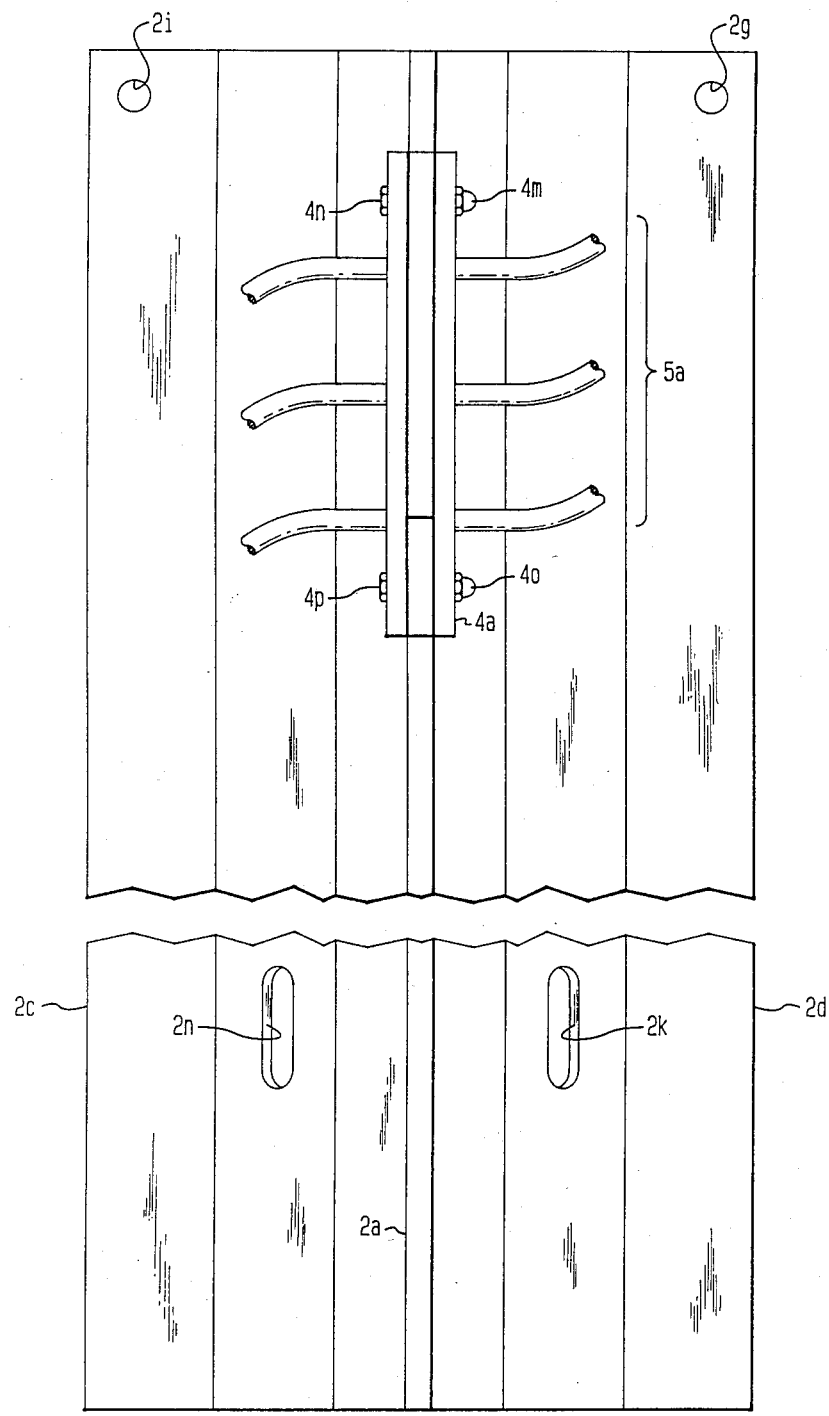
FIG. 6 is a side-elevational showing of the pole of FIG. 5 including the cable attachments, rotated through 90 degrees.
Figure 7B:
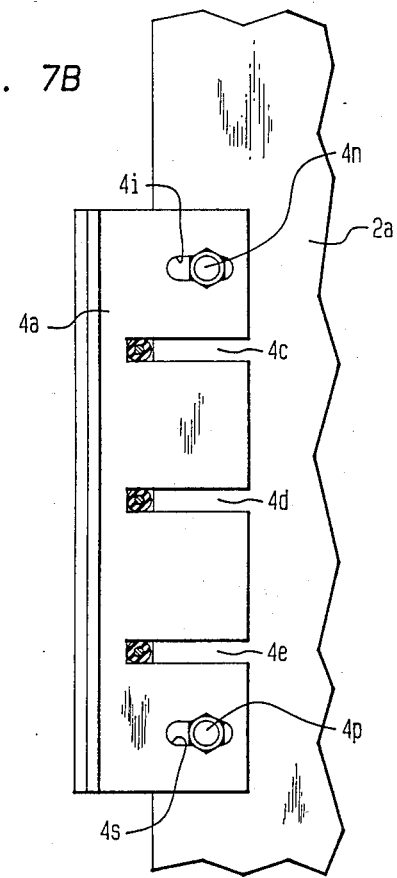

To the end of supporting utility cables, one or more attachments, 4a and 4b are seated on oppositely-directed fins 2a and 2b, as shown in section in FIG. 4, in side-elevation in FIG. 5, and in end-elevation in FIG. 6, which show one type of attachment in accordance with the pressent invention. An attachment of this type is shown in greater detail in the enlarged, fragmentary showings of FIGS. 7A, 7B, 7C and 7D. FIG. 7A shows a view, looking down on the top of attachment 4a. FIG. 7B is an enlarged showing in side-elevation of the attachment 4a bolted in place by means of round-headed bolts or screws 4m and 4o, which respectively penetrate the elliptical openings 4i and 4s, and are secured in place by the washers 4n and 4p. FIG. 7C is an end-elevational view of attachment 4a in place; and FIG. 7D is a side-elevation of attachment 4a, partially removed form the fin 2a, being rotated outward about the bolt 4o.

In the present embodiment, the attachment 4a is 2¾ inches in overall width (in a horizontal plane when in fixed, upright position), and 8 inches in height. It comprises two inner legs or slots, each 2½ inches wide, and ⅛ inch thick, running the length of the attachment, disposed in parallel relation, spaced-apart, say, ⅜ inch, to form a slot 4u running the length of the attachment, which accommodates and seats on the fin 2a. Each of the parallel legs forming longitudinal slot 4u has three parallel slots, 4c, 4d, and 4e, which, in the present embodiment, are, say, ¼ inch wide and extend about 2 inches outward in a horizontal direction from the secured inner edge, when the attachment 4a is in place. The upper edge of the upper slot 4c is about 1¾ inches below the top; and the slots 4c, 4d and 4e are separated from each other by vertical distances of about 1¾ inches.

The outer ends of the slots 4c, 4d, and 4e are laterally spaced about ¾ inch from the edge of fin 2a, so as to form pockets with each accommodate, and secure in place, one of the cables 5a, when bolted into place on the fin 2a. The cables 5a are placed in and removed from engagement with the slots 4c, 4d and 4e by loosening and removing the upper blot or screw 4m, and rotating 4a outwards about the bolt or screw 4o which terminates in the washer 4p. It will be understood that attachment 4b is a mirror image of 4a, its construction and operation being similar.

A modified form of attachment in accordance with the present invention is shown in FIGS. 8A, 8B, 8C, 8D and 8E. FIG. 8A shows the view looking down on top of attachment 14a, which is seated on fin 2a. FIGS. 8B and 8C, respectively, show side and end-elevations. Similar to the previously described embodiment, the attachment 14a comprises a pair of parallel legs, or slots which form between them a vertically-extending slot 14u, extending the length of the attachment, the inner, open end of which seats on the outer edge of the fin 2a, being fastened in an upright, vertical position by a pair of screws or bolts 14m, 14o, which penetrate the respective elliptical openings 14i and 14j, and are secured in place by the washers 14n and 14p. Also, in the manner of the previously described embodiment, the attachment 14a has a plurality of laterally-extending, parallel slots, 14c, 14d and 14e, the principal difference from the slots of the previously described embodiment being that they open inward from the outer end, permitting the cable elements 5a to be slid in place in the slots without unscrewing or removing the bolts 14m or 14o. An important difference between the vertical slot 4u of the previously described embodiment, and the vertical slot 14u of the presently described embodiment, is that the latter extends out further in a lateral direction, providing a lateral clearance of at least about 1½ inches from the edge of the fin 2a, when the attachment 14a is seated in place on the fin 2a.

In accordance with a unique arrangement in the case of this embodiment, the cable members 5a are secured in the respective slots 14c, 14d and 14e by an elongated member 24, which is formed from flat stock ⅛ inch thick, which is, say, 9 inches in overall length, having a head portion 24e which is, say, 2 inches wide, and 1½ inches high, and a stem portion 24f which is, say, 1 inch wide, and 8 inches long. In any case, the head portion 24e must have a lateral extent which exceeds the lateral extent the slot 14u; and the stem portion 24f must be narrow enough to fit longitudinally into slot 14u, so that when the member 24 is dropped in place, the head 24e rests on the top of the attachment 14a, and the stem extends downward into the slot, securing the cable members 5a in place in their respective slots 14c, 14d and 14e.

A most important feature of the structures of the present invention is their composition, which is of resins reinforced by glass fibers, and other reinforcing fibers, such as carbon and aramid fibers, and their method of fabrication by a process known as 'pultrusion'.

A suitable material for the structures of the present invention is a glass-fiber reinforced polyester, although the basic resins may also comprise or consist of epoxies and/or silicones. Of these families of resins, those that do not evolve gaseous products are deemed most suitable. Also, high heat distortion, fast cure, low viscosity and good 'wet-out', and a long pot life of eight hours or more, are desirable resin characteristics for the purposes of the present invention.

A preferred material for the structures of the present invention is sold by the Morrison Molded Fiber Glass Company (MMFG) of Bristol, Va., under the registered trademark "EXTREN", which is described as a proprietary combination of fiber glass reinforcements and thermosetting polyester or vinyl ester resin systems. The resin system for materials known by the trademarks EXTREN ® 500 or EXTREN ® 525, is selected from formulations based on isophthalic polyester, vinyl ester, and/or epoxy. The material known by the trademark EXTREN ® 525 is especially adapted for uses of the present invention, in that it is fire resistant, being characterized by a flame Resistance (FTMS 406-2023) of lgn/burn/seconds 75/75. These materials are characterized by the properties shown in the following table:

| TYPICAL PROPERTIES OF MFG EXTREN ® | | |
|---|---|---|
| | Standard Shapes Series 500 & 525 | |
| Mechanical (coupon) | Rovmat | Improved |
| Longitudinal Direction | | |
| Ultimate Tensile Strength, psi | 30,000 | 30,000 |
| Ultimate Compressive Strength, psi | 20,000 | 30,000 |
| Ultimate Flexural Strength, psi | 30,000 | 30,000 |
| Tensile Modulus, psi × $10^6$ | 2.3 | 2.5 |
| Compressive Modulus, psi × $10^4$ | 2.3 | 2.5 |
| Flexural Modulus, psi × $10^6$ | 1.3 | 1.6 |
| Ultimate Shear Strength, psi | 4,500 | 5,500 |
| Ultimate Bearing Stress, psi | 20,000 | 30,000 |
| Izod Impact Strength (ASTM-D256) ft-lbs per inch of notch (Sample Thickness-⅛″ except ¼″ for rod) | 18 | 25 |
| Transverse Direction | | |
| Ultimate Tensile Strength, psi | 5,000 | 7,000 |
| Ultimate Compressive Strength, psi | 10,000 | 15,000 |
| Ultimate Flexural Strength, psi | 10,000 | 10,000 |
| Tensile Modulus, psi × $10^6$ | 0.8 | 0.8 |
| Compressive Modulus, psi × $10^6$ | 1.0 | 1.0 |
| Flexural Modulus, psi × $10^6$ | 0.6 | 0.8 |
| Ultimate Shear Strength, psi | 4,500 | 5,500 |
| Ultimate Bearing Stress, psi | 20,000 | 30,000 |
| Izod Impact Strength (ASTM-D256) ft-lbs per inch of notch | 4 | 4 |
| Bard Hardness | 50 | 50 |
| Full Section in bending | | |
| Modulus of Elasticity, psi × $10^4$ | 2.3 | 2.5 |
| Tensile Strength, psi | 20,000 | 20,000 |
| Compressive Strength, psi | 20,000 | 20,000 |
| Electrical | | |
| Electric Strength, short term in oil, ⅛″ (ASTM-D149), vpm* | 200 | 200 |
| Electric Strength, short term in oil, KV per inch** | 25 | 35 |
| Dielectric Constant, 60 Hz, (ASTM-D150)* | 5.0 | 5.0 |
| Dissipation Factor 60 Hz. (ASTM-D150)* | 0.03 | 0.03 |
| Arc Resistance (ASTM-D495), seconds*** | 80 | 80 |
| Thermal | | |
| Thermal Coefficient of Expansion (ASTM-D696)(inches/inch/°F.)*** | $5 \times 10^{-6}$ | $5 \times 10^{-6}$ |
| Thermal Conductivity, BTU per sq. ft./hr./°F./in. | 4 | 4 |
| Specific Heat, BTU/Lb/°F. | 0.28 | 0.28 |
| Other | | |
| Density (ASTM-D792) lbs./in³ | | |
| Solid Shapes | 0.059 (S-500) 0.062 (S-525) | 0.062 (S-500) 0.65 (S-525) |
| Hollow Shapes | 0.061 (S-500) 0.064 (S-525) | NOTE 2 |
| Specific Gravity (ASTM-D792) | | |

-continued

TYPICAL PROPERTIES OF MFG EXTREN ®

| Mechanical (coupon) | Standard Shapes Series 500 & 525 | |
|---|---|---|
| | Rovmat | Improved |
| Solid Shapes | 1.64 (S-500) | 1.72 (S-500) |
| | 1.72 (S-525) | 1.80 (S-525) |
| Hollow Shapes | 1.69 (S-500) | NOTE 2 |
| | 1.78 (S-525) | |
| Water Absorption (24 hour immersion) (ASTM-D570) Max. % by weight | 0.75 | 0.60 |
| Fire Retardant Properties-Series 525 | | |
| Flame Resistance (FTMS 406-2023) ign./burn, seconds | 83/58 | |
| Intermittent Flame Test (HLT-15), rating | 100 | |
| Flammability Test (ASTM-D635) | self. ext. | |
| Surface Burning Characteristics (ASTM-E84), maximum | 25 | |
| UL APPROVED (Yellow Component Card) | | |
| UL 94 Flammability Classification | S E-O | |
| Temperature Index (°C.) | 130 | |

NOTE 1: Lengthwise Izod Impact Strength increases with thickness except strength for ¼" Flat Sheet is about 67% of reported value. Tensile Strength of Rod: as determined on a full section piece. Flexural Strength of Rod: as determined in simple bending.
NOTE 2: We have been unable to adapt the improved process to all standard shapes, so some standard shapes are available only in the Rovmat material. Properties of custom products can be tailored to meet the requirements of the customer within above limitations.
*Specimen tested perpendicular to laminate face.
**1" long specimen tested parallel to laminate face using 2" dia. electrodes.
***Indicates reported value measured in longitudinal direction.
N/A — Not applicable
N-T — Not tested For additional information about these materials, please see the brochure entitled "MFG EXTREN Fiber Glass Reinforced Plastic (FRP) Pultrusions", published by the Morrison Molded Fiber Glass Company, P.O. Box 508, Bristol, Va. 24201, which is incorporated into this application and made a part thereof, by reference, published about 1971.

The fiber reinforced resin selected in accordance with the criteria discussed in the foregoing paragraphs is then processed to the desired shaped illustrated herein by a process called 'pultrusion'. The latter is defined as the process for producing reinforced plastic profiles in continuous lengths by pulling raw materials comprising thermosetting liquid resins and fiber reinforcements through combining, shaping and curing operations, where they are combined and pulled through a die, instead of being pushed through or extruded, as in more conventional processes. The pultrusion process steps are described in detail in a two part series by Linda Krutchkoff in *Plastics Design & Processing,* published by Lake Publishing Corp., P.O. Box 159, Libertyville, Ill. 60048, of articles entitled "Process Converts Thermoset Materials Into Finished Shapes Continuously", (Page 34, July 1980), and "Desirable Resin Properties Are High Heat Distortion, Fast Cure, Good Wet-Out", (Page 37, August 1980), which articles are made a part of this disclosure, being incorporated herein by reference.

Referring to FIG. 9 of the drawings, which is a schematic showing of a pultrusion process, there is shown a plurality of creels, 6, 7 and 8, wound with fiber glass roving, or such other fibers as may be used in the process, which are motor driven to rotate and unwind at speeds up to, say, 25 feet per minute. The strands from the three creels 6, 7 and 8, (which may be more, or less) are wound together into a segregated collection of strands, or cloth, comprising from 40–80% glass fibers, which may be combined with carbon or aramid fibers, which pass over the guide wheel 10, where they may be braided together, spirally-wrapped, or hoop-wound for reinforcement, to provide tensile strengths of up to $10^5$ pounds per square inch.

The braided or wrapped roving then passes into the resin impregnating tank 9, which may be a bath of polyester, or alternatively, resin or silicone, maintained in a liquid state of substantially low viscosity by heating means not shown.

Fillers, pigments, flame retardants and other common plastic additives are used in combination with the resin bath to obtain specific end-use properties. Filler levels usually range from zero to 20%, the limit being due to the viscosity of the bath, which, at too high concentrations of reinforcement will not wet adequately. Common fillers used are aluminum silicate, calcium carbonate and antimony trioxide. An internal release agent, selected from the group comprising organic phosphates, lecethin or metal stearates, is also used to prevent thermosetting gel from adhering to the die wall. Also, pigments may be added to increase resistance to ultraviolet radiation; and bubbles to about 2% or less by weight, are added to reduce friction in the die.

From the tank 9, the resin impregnated roving moves into and through the resin control device 11 where the excess resin is removed, and into the two-part preshaping die 12, which serves to preform the profile of the roving to the approximate required shape before molding, to assure proper directional alignment of the reinforcing fibers in the resin. This is achieved by simple ring orifices, or sheet metal guides and mandrels. The preforming die 12 comprises, for example, a radio frequency curing means operating at, say, 70 milliherz, if the resin is polyester, which functions to promote curing throughout the mass, with the lowest possible heat input, promoting a uniform cure. The preforming die 12, is slotted, as shown at 12a, with a slot 12a which passes uniformly through the die 12 in a horizontal direction, in order to provide the roving with the desired pre-shape. For the present process, this shape is octagonal in form, having an outer perimeter which is 7½ inches wide in a diametrical direction, measured between the centers of the flat sides, the thickness width of the slot being ⅛ inch. Two diametrically-extending slots, each ⅛ inch wide, divide the cross-section into four equal quadrants. At the ends of each of the diametrical slots are outwardly-directed slots, each 2 inches long and ¼ inch wide, which function to form the outwarding-directed fins on the pole, as shown in FIGS. 1 and 2.

The preformed roving then passes into the two-part heated die 13 (FIG. 11) which is preferably of steel, with chrome plating to reduce the coefficient of friction, extend the die life, and improve resin release. Die lengths vary in accordance with production rates, but for present purposes are usually 18–60 inches long. Where preheating is not employed, the length of the die is a major factor in the lineal running speed. Heated metal, continuous cure dies, such as die 13, may require a separate cold junction section to prevent premature hardening of the resin. A steel die, such as the die 13, may be heated with electrical strip heaters placed on the die exterior surfaces, or resistance heater rods cored into the die, or cored for hot oil heating. The operating temperature range is from 240–375 degrees F. for polyester resins. The die heating means being conventional, have not been shown. Very accurate dimensional tolerances are typical of heated-steel-die pultrusions, with variations occurring only due to resin shrinking during cooling.

Pultrusion part sizes are currently limited to 12 inches in height and 10 feet in width, the wall thickness being a function of the material used.

After passing through the heated die 13, the finished pultruded hollow pipe passes through the puller mechanism 14a, 14b, the two halves of which serve to pull the evolving product along to the end of the line, where a rotary saw 16, driven to rotate by the motor 15, cuts off the pole to the desired length.

It will be understood that in addition to the body portion 2 of the subject utility pole 1, the attachments 4a, 4b and 14a, 14b can also be formed by pultrusion.

Referring to FIG. 12, there is shown a steel die 15, in general form similar to the die 12 of FIG. 11. Die 15 has a two-part body portion, forming between the parts a slot 15a which passes uniformly through the thickness of the die in a horizontal direction. The slot 15a has a head portion in a horizontal plane and a pair of legs spaced-apart in parallel vertical planes which are constructed in accordance with the pultruded shape shown, for example, in FIG. 7A. Dies are constructed in a similar manner for producing the pultruded shape of the alternative attachment shown in FIG. 8A.

As indicated in FIG. 1, when the hollow utility pole is in place, it is topped by a cover or "pot" 3, shown in perspective in FIGS. 13A and in diametrical section in FIG. 13B, which functions to prevent water, ice, refuse, animals, etc., from getting inside. The cover or pot 3 has an octagonal base, having a vertical outer wall about, say, 2 inches high, forming a right angle at its upper edge with an inwardly-directed horizontal wall about, say 1½ inches wide. Together, these form around the periphery of the octagonal base of 3 an inner recess, as shown in partial section in FIG. 13B, which is constructed to fit over and seat on the octagonal upper edge of the body portion 2 of hollow pole 1. This base portion of the top or pot 3 supports a frusto-pyramidal-type upper structure, which terminates at its upper end in a square closed top. Superposed on this are the horizontally projecting fins 3a, 3b, 3c, and 3d, forming a cruciform configuration, projecting from the top and sides, which corresponds to, and fits over the fins 2a, 2b, 2c and 2d of the pole body 2.

In order to prevent birds and other animals from roosting on the flat portion of the top or pot 3, an additional 'anti-roost' attachment 20, shown in side-elevation in FIG. 14A, and in end-elevation in FIG. 14B, may be seated thereon. The lower end of this structure may be similar in shape to the attachment 4a, shown in FIG. 7A, in that it comprises a pair of parallel legs 2a and 2b spaced-apart, which are fastened to the top of one pair of fins, say, 3b and 3d, by bolts or screws interposed through the openings 20d. The upper end 20c is shaped to a point, as shown in FIG. 14A.

As indicated in FIG. 15, the fins 3a, 3b, 3c and 3d on the cap (pot) 3 are intended for the same purpose as the fins on the pole body, that is, to mount added current conducting cable.

FIG. 15 illustrates attachment 24a which is constructed to support high voltage transmission lines 15, and attachment 34a, which is constructed to support medium and low voltage distribution lines 25.

Another high voltage cable 35 is secured in place in a slot in the lower portion of roost 20, by the upper end of the fin 3a.

Although the invention has been described with reference to specific embodiments, it will be understood that the invention is not limited to any of the specific shapes or dimensions, shown by way of illustration, but only by the scope of the appended claims.

What I claim is:

1. Supporting means for an electrical current delivery system which comprises a hollow utility pole of thermoset fiber-reinforced resin, of substantially uniform overall cross-sectional dimension throughout its length, integrally-formed by the process of pultrusion, and including integrally-formed internal supporting means comprising inwardly-projecting ribs and projections from the outer surface for accommodating utility wire supports.

2. A utility pole in accordance with claim 1 wherein said fiber reinforced resin consists essentially of a glass fiber reinforced resin system selected from the group consisting of isophthalic polyester, vinyl ester, and epoxy.

3. A combination in accordance with claim 1 wherein the body of said pole is of a hollow shape substantially symmetrical about its long axis, and said integrally-formed internal supporting means comprise at least one diametrically-disposed internal strut extending along its length.

4. A combination in accordance with claim 3 wherein said pole has a cross-section which is octagonal about its long axis.

5. A combination in accordance with claim 3 wherein said pole is cylindrical about its long axis.

6. A combination in accordance with claim 3 wherein said integrally-formed projections comprise one or more pairs of fins directed outwardly in a radial direction from the periphery of said pole, and extending along the length of said pole.

7. A hollow utility pole of fiber reinforced resin, of substantially uniform overall cross-sectional dimension throughout its length and substantially symmetrical about its long axis, integrally-formed by the process of pultrusion, and including integrally-formed internal supporting means comprising at least one diametrically-disposed internal strut extending along its length, and integrally-formed projections from the outer surface for accommodating utility wire supports;

wherein said integrally-formed projections comprise one or more pairs of fins directed outwardly in a radial direction from the periphery of said pole, and extending along the length of said pole;

the combination comprising at least one attachment having a longitudinal slot constructed to fit over and seat lengthwise along at least one of said fins, said attachment having one or more lateral slots for accommodating and supporting electrical current bearing utility cables, and means for securing said electrical current bearing utility cables in said one or more lateral slots.

8. The combination in accordance with claim 7 wherein said lateral slots are closed at the outer edge of said attachment and said lateral slots are open at their inner ends except when secured in place against the outer edge of said one fin for securing said cables in their respective slots against the outer edge of said one fin.

9. The combination in accordance with claim 7 wherin said lateral slots are open at the outer edge of said attachment and wherein said means for accommodating and securing said utility cables comprise a longitudinally-extending slot transverse to said lateral slots, and an elongated plug which slides into said longitudinally-extending slot for securing said cables in said lateral slots.

10. The combination in accordance with claim 3 wherein the body portion of said pole is characterized by a pair of diametrically-disposed internal struts at right angles to each other, which divide the internal portion of said pole into four substantially equal quadrants along the length of said body portion.

11. A hollow utility pole of fiber reinforced resin, of substantially uniform overall cross-sectional dimension throughout its length and substantially symmetrical about its long axis, integrally-formed by the process of pultrusion, and including integrally-formed internal supporting means and projections from the outer surface for accommodating utility wire supports;

wherein said integrally-formed internal supporting means comprise a pair of diametrically-disposed internal struts disposed at right angles to each other, extending along its length which divide the internal portion of said pole into four substantially equal quadrants along the length of said body portion;

each of said diametrically-disposed struts terminating at its opposite lateral edges in a pair of radially-projecting fins which extend substantially along the length of said body portion.

12. A hollow utility pole of fiber reinforced resin, of substantially uniform overall cross-sectional dimension throughout its length and substantially symmetrical about its long axis, integrally-formed by the process of pultrusion, and including integrally-formed internal supporting means and projections from the outer surface for accommodating utility wire supports;

wherein said integrally-formed internal supporting means comprise at least one diametrically-disposed internal strut extending along its length;

the said pole comprising in combination a closure constructed to seat on the upper edge of the body of said pole for shielding the interior of said pole from the weather and entrance therein by animals, said closure providing a slight clearance between the base of said closure and the upper edge of said body to permit the passage of air.

13. The combination in accordance with claim 12 which comprises an anti-roost device which is shaped to engage and be secured on the upper surface of said closure, said anti-roost device terminating on its upper surface in an acutely angular pinnacle for preventing roosting thereon by birds and other animals.

14. The combination in accordance with claim 12 wherein said closure comprises one or more pairs of fins directed laterally from the periphery of said closure;

at least one attachment having a longitudinal slot constructed to fit over and seat lengthwise along at least one of said fins, said attachment having one or more lateral slots for accommodating and supporting utility cables, and means for securing said utility cables in said one or more lateral slots.

15. In combination with an electrical current delivery system comprising a hollow non-metallic utility pole wherein the body of said pole has one or more internal supporting ribs and has one or more pairs of fins directed outwardly from the periphery of said pole, the subcombination comprising an insulating attachment, which is formed from fiber reinforced thermoset plastic material, having a longitudinal slot constructed to fit over and seat lengthwise along one of said fins, said attachment having one or more lateral slots for accommodating and supporting electrical current bearing utility cables, and means for securing said electrical current bearing utility cables in said one or more lateral slots.

16. The subcombination in accordance with claim 15 wherein said one or more lateral slots are closed at the outer edge of said attachment and said lateral slots are open at their inner ends except when secured in place against the outer edge of said one fin for securing said cables in their respective slots against the outer edge of said one fin.

17. The subcombination in accordance with claim 15 wherein said one or more lateral slots are open at the outer edge of said attachment and wherein said means for accommodating and securing said utility cables comprise a longitudinally-extending slot transverse to said lateral slots, and an elongated plug which slides into said longitudinally-extending slot for securing said cables in said lateral slots.

18. In combination with an electrical current delivery system comprising a hollow non-metallic utility pole wherein the body of said pole has one or more internal supporting ribs and has one or more pairs of fins directed outwardly from the periphery of said pole, the subcombination comprising a closure of insulating material, which is formed from fiber reinforced thermoset plastic material, constructed to seat on the upper edge of the body of said pole for shielding the interior of said pole from the weather and entrance therein by animals, said closure providing a slight clearance between the base of said closure and the upper edge of said body to permit the passage of air.

19. The subcombination in accordance with claim 18 which comprises an anti-roost device which is shaped to engage and be secured on the upper surface of said closure, said anti-roost device terminating on its upper surface in an acutely angular pinnacle for preventing roosting thereon by birds and other animals.

20. The subcombination in accordance with claim 18 wherein said closure comprises one or more pairs of fins directed out laterally from the periphery of said closure;

at least one attachment having a longitudinal slot constructed to fit over and seat lengthwise along at least one of said fins, said attachment having one or more lateral slots for accommodating and supporting utility cables, and means for securing said utility cables in said one or more lateral slots.

* * * * *